Patented Oct. 12, 1948

2,450,870

UNITED STATES PATENT OFFICE 2,450,870

PROCESS OF MAKING MANGANOUS SULFATE

Charles C. Daugherty, Siler City, N. C., assignor to The Chatham Chemical Company, Siler City, N. C., a corporation of North Carolina No Drawing. Application September 20, 1945, Serial No. 617,692

7 Claims. (Cl. 23—117)

This invention relates to a method of treating manganese containing ore. More particularly, it is concerned with a method for the reduction of manganese compounds to yield manganous salts.

A principal object of this invention is the provision of a new method for the treatment of manganese containing ore, particularly ore containing the manganese in the tetravalent and trivalent state. Another object is the provision of a new method for the reduction of manganese from the tetravalent state to the divalent state. Further objects include the provision of a new method for transforming manganese dioxide into manganous salts, the provision of a new method for extracting the manganese values from manganese containing ore and the provision of new reagents for conducting such methods in a commercially feasible manner without requiring the use of extreme reaction conditions. Another object is the provision of a manganese reduction process in which the extent of reaction may be readily and accurately controlled. Further objects and the entire scope of applicability of this invention will become apparent from the detailed description given hereinafter.

These objects are accomplished according to the process of this invention by the method which basically comprises the admixture of a carbohydrate with a strong mineral acid to form a uniform mixture of the two and the reaction of this carbohydrate-acid mixture with the manganese containing compound for a sufficient length of time to reduce the manganese to the divalent state and form the manganous salt of the acid of treatment mixture.

The success of this invention resides primarily in the discovery that mixtures of carbohydrates with strong mineral acids are unusually effective in reducing the manganese to the divalent state without causing reduction to metallic manganese. In brief, the process utilizing this discovery is as follows:

Carbohydrate material, such as alpha-cellulose, sawdust or corn-stalks, is admixed with a suitable quantity of a strong mineral acid, such as sulphuric acid, to form homogenous mixture of these materials. The manganese containing ore, such as manganese dioxide or pyrolusite, is thoroughly mixed with the carbohydrate-acid mixture. A small quantity of heat is then applied to the mixture, if necessary, in order to initiate the reduction reaction. The ensuing reaction is strongly exothermic so that once it has started, further application of heat is unnecessary.

When the reaction has been completed, the manganous salt, e. g., manganous sulphate in cases where sulphuric acid is employed, is separated from the spent reaction liquors in any suitable fashion.

One particularly suitable separation procedure comprises treating the resulting acidic solution of the manganous salt with a basic material capable of neutralizing the acid and, preferably, capable of precipitating any impurities, such as iron, alumina from the mixture, e. g., calcium carbonate or manganese carbonate. The undissolved solids are then removed, for example by filtration, from the mixture and the solution concentrated by evaporation.

A more comprehensive understanding of this invention may be obtained from a consideration of the following illustrative examples in which all parts are by weight unless otherwise specified.

Example I

A mixture of 100 parts of sawdust and 1375 parts of 60° Bé. sulphuric acid is prepared by adding the sawdust to the sulfuric acid while the latter is sufficiently agitated so as to homogeneously disperse the sawdust through the acid.

A pulp of the manganese containing ore to be treated is prepared by first grinding 2500 parts of pyrolusite with a 45 per cent $MnO_2$ content and 1500 parts of water through a ball mill. After this mixture has received sufficient grinding it is mixed with sufficient water to yield a slurry of 15 per cent solids and this slurry is passed through a classifier. The classified material is then thickened to give a pulp containing 60 per cent solids.

The thickened pyrolusite pulp is added gradually to the sawdust-acid mixture while the latter is thoroughly agitated. The sawdust-acid mixture is sufficiently warm to initiate the reaction between the $MnO_2$ and other components of the mixture and the reaction proceeds with such vigor and evolution of exothermic heat that the reaction mixture reaches its boiling point almost at once.

After a short time the reaction subsides and an additional 100 parts of sawdust are added to the reaction mixture. Again the vigorous reaction ensues and the mixture again boils strongly. After another short period of time the reaction subsides and the procedure is repeated by the addition of a third 100 parts of sawdust.

The completion of the reduction process is indicated by the cessation of reaction heat evolution. When this point is reached sufficient water is added to the mixture to cool and dilute the mixture to 25 per cent solids content. The diluting water is preferably of a temperature to yield a diluted mixture of a temperature of 39° C.

After the dilution step, sufficient manganese carbonate is added to the mixture to neutralize any residual acid and the admixture is thoroughly agitated. Thereafter, the insoluble matter in the mixture, e. g., clay, carbon, iron oxides, silica, and the like are removed from the mixture by filtration. Finally, the manganous sulphate produced by the process is recovered by evaporation of the filtered solution. The process results in the production of 2000 parts of manganous sulphate.

*Example II*

Twenty-five parts of alpha-cellulose are added to 135 parts of 95% sulphuric acid and these two materials are sufficiently agitated to form a homogenous admixture. To this carbohydrate-acid mixture is then slowly added 115 parts of finely ground manganese dioxide with continuous stirring. After the manganese dioxide has been thoroughly dispersed through the acid solution, sufficient external heat is applied to the mixture to raise the temperature to about 80° C. At this temperature reaction between the components of the mixture begins and further heating is discontinued. The reaction continues with the evolution of considerable exothermic heat so that the mixture rapidly reaches its boiling point and foams quite vigorously.

The end of the reaction is marked by the discontinuation of reaction heat evolution. At this point, 400 parts of water at 10° C. are added to dilute and cool the mixture. When the diluting water has been thoroughly incorporated in the mixture, 20 parts of calcium carbonate are slowly added to the acid solution. The addition of the carbonate results in the neutralization of the excess acid in the solution.

When the addition of the calcium carbonate and its reaction with the mixture is complete, the resulting solution is filtered. The manganous sulphate produced by the process is then recovered from the filtered solution by evaporation of water. Two hundred parts of manganous sulphate are produced by the procedure.

The examples above indicate that the optimum temperature for reaction in this process is not critical. The exact temperature which is employed is in part dependent on the time employed for the reaction, shorter times of reaction requiring higher temperature and longer times of reaction permitting lower temperature to be employed. Depending primarily upon the length of time which may be tolerated in the recovery of manganese values, temperatures between 100° and 400° C. are advantageous in my process, but the reaction is most advantageously conducted at the atmospheric boiling point of the reaction mixture.

Various methods of controlling the speed of reaction may be employed, e. g., use of external cooling to control the reaction temperature. However, I have discovered that an unusual close control of the reaction may be had by controlling the speed and quantity of addition of the carbohydrate to the reaction mixture. This control method is illustrated in Example I above.

Alpha-cellulose, sawdust and corn stalks have been indicated as suitable carbohydrates for use in my process. Apparently, substantially any material which contains an appreciable quantity of carbohydrate is suitable. Examples of other materials which have been found suitable as the carbohydrate components of my process include starch, sucrose, glucose, arabinose, waste paper and the like.

The concentration of the carbohydrate in the carbohydrate-acid treating solution is not critical. This concentration may be varied in order to accommodate the concentration of manganese in the ore being treated, the material of the particular ore and also the particular carbohydrate which is employed in the reaction, i. e., more pure material such as alpha-cellulose will be used in less quantity than less pure material such as waste paper. Although, ratios of carbohydrates to acid in the acid treating solution outside of these limits may be utilized, it has been found that ratios of carbohydrate to acid between 1 to 100 and 2 to 1 are most advantageous and ratios between 1 to 20 and 1 to 3 are preferable.

The acids to be employed in the process must be capable of causing reaction between the carbohydrate and the manganese compound being treated, and should be capable of forming salts from the manganese reduction produce which are soluble in the treating acid. Sulphuric acid is the preferred treating acid. The salts which are produced by the process are manganous salts of the particular acid used in the treatment process, e. g., manganous sulphate in the case of the use of sulphuric acid.

The concentration of acid which is employed is not critical and it has been found that substantially all concentrations of acid are more or less usable. Since very dilute acids require extensive lengths of time for the completion of the process, acids of considerable concentration are preferable, for example, concentration of 45 to 90%, although, acids between concentration of 5 to 100% can be employed.

The ratio of weight of acid to weight of manganese containing material being treated and, in turn, the ratio of the carbonhydrate-acid mixture which is employed in the treatment process to the manganese material, is not critical. Obviously, sufficient acid should be used so as to react with all of the manganese reduction products. On the other hand, since it is desirable in most cases to obtain the manganous salt in a relatively neutral condition, it is desirable to avoid a large excess of acid since the excess merely wastes the basic materials, e.g., manganese carbonate, used to neutralize the acid. An example of the magnitude of the ratio of acid to manganese compound to be used in any case may be had from the case wherein substantially pure manganese dioxide is treated with an acidic reagent composed of 95% sulphuric acid, in which case ratios of between 8 to 7 and 2 to 1 appear most satisfactory.

The treatment process of this invention is generally applicable to all compounds which contain manganese in the trivalent or tetravalent state, e.g., manganese dioxide. Since the process is relatively simple and requires treatment reagents which are of very low cost, the process is advantageously used with low grade manganese containing ores, e.g., those containing 30 to 35 per cent manganese and 25 to 30 per cent iron. Examples of ores which may be treated according to this invention include pyrolusite, psilomane and manganite.

I claim:

1. The process of extracting manganese from material containing manganese with a valency greater than two which comprises treating said material with a mixture of a carbohydrate substance and a strong mineral acid whereby the manganese values in said material are extracted therefrom and said values are transformed into manganous salt of said acid, and, thereafter, recovering the manganous salt from the reaction mixture.

2. The process of extracting maganese from ore containing a substantial proportion of manganese dioxide which comprises treating said ore with a mixture of sulphuric acid and a material composed of a major portion of cellulose whereby the manganese in said ore is transformed into manganous sulphate, and, thereafter, recovering the manganous sulphate from the reaction mixture.

3. The process of reducing manganese from a valency greater than two to a valency of two which comprises reacting the manganese compound with a mixture of a carbohydrate material and a strong mineral acid.

4. The process of claim 3 in which said acid is sulphuric acid.

5. The process of claim 3 in which said carbohydrate material is sawdust.

6. The process of recovering manganese values from ore containing a substantial proportion of manganese dioxide which comprises reacting said ore with a mixture consisting of one part of sawdust and between 20 parts to 3 parts of sulphuric acid until substantially all the manganese in said ore has been transformed into manganous sulphate and, thereafter, recovering said manganous sulphate from the reaction mixture.

7. The process of recovering manganese from material containing manganese with a valency greater than two which comprises treating said material with sulphuric acid and controlled amounts of a carbohydrate substance whereby the manganese values in said material are transformed into manganous sulphate at a rate proportional to the rate of introduction of said carbohydrate to the reaction mixture, and, thereafter, recovering the manganous sulphate from the reaction mixture.

CHARLES C. DAUGHERTY.

REFERENCES CITED

The following references are of record in the file of this patent:

UNITED STATES PATENTS

| Number | Name | Date |
|---|---|---|
| 1,417,153 | Fairlie et al. | May 23, 1922 |

FOREIGN PATENTS

| Number | Country | Date |
|---|---|---|
| 461,800 | Great Britain | Feb. 24, 1937 |